United States Patent
Osindero

(10) Patent No.: US 10,043,231 B2
(45) Date of Patent: Aug. 7, 2018

(54) METHODS AND SYSTEMS FOR DETECTING AND RECOGNIZING TEXT FROM IMAGES

(71) Applicant: OATH INC., New York, NY (US)

(72) Inventor: Simon Osindero, San Francisco, CA (US)

(73) Assignee: OATH INC., New York, NY (US)

(*) Notice: Subject to any disclaimer, the term of this patent is extended or adjusted under 35 U.S.C. 154(b) by 34 days.

(21) Appl. No.: 14/755,817

(22) Filed: Jun. 30, 2015

(65) Prior Publication Data

US 2017/0004374 A1    Jan. 5, 2017

(51) Int. Cl.
| | |
|---|---|
| G06K 9/62 | (2006.01) |
| G06T 1/20 | (2006.01) |
| G06F 17/30 | (2006.01) |
| G06K 9/00 | (2006.01) |
| G06K 9/32 | (2006.01) |

(52) U.S. Cl.
CPC ........ *G06T 1/20* (2013.01); *G06F 17/30253* (2013.01); *G06K 9/00476* (2013.01); *G06K 9/325* (2013.01); *G06K 2209/01* (2013.01); *G06T 2207/20084* (2013.01)

(58) Field of Classification Search
None
See application file for complete search history.

(56) References Cited

U.S. PATENT DOCUMENTS

| | | |
|---|---|---|
| 7,809,192 B2 | 10/2010 | Gokturk et al. |
| 8,676,803 B1 | 3/2014 | Leung et al. |
| 2002/0159636 A1* | 10/2002 | Lienhart ............... G06K 9/325 382/176 |
| 2003/0152269 A1* | 8/2003 | Bourbakis .......... G06K 9/00456 382/187 |
| 2006/0251339 A1* | 11/2006 | Gokturk ............ G06F 17/30253 382/305 |
| 2008/0002916 A1 | 1/2008 | Vincent et al. |
| 2009/0060335 A1* | 3/2009 | Rodriguez Serrano .................... G06K 9/00194 382/177 |
| 2012/0224765 A1* | 9/2012 | Kim ...................... G06K 9/325 382/159 |
| 2013/0182182 A1* | 7/2013 | Mountain ........ H04N 21/44008 348/564 |

(Continued)

FOREIGN PATENT DOCUMENTS

WO    2008003095 A2    1/2008

OTHER PUBLICATIONS

Drira, Fadoua, and Franck Lebourgeois. "Denoising textual images using local/non-local smoothing filters: A comparative study." Frontiers in Handwriting Recognition (ICFHR), 2012 International Conference on. IEEE, 2012. 6 pages.*

(Continued)

*Primary Examiner* — Ryan P Potts
(74) *Attorney, Agent, or Firm* — James J. DeCarlo; Greenberg Traurig, LLP

(57) ABSTRACT

Images that comprise text are identified and output from the images is generated wherein the output comprises text from the image in textual data format. The portions of an image comprising the text data are initially identified and the text imaged by the pixels of that image portion is extracted in textual data format. The extracted text is stored so that a search for images comprising particular text is enabled.

22 Claims, 12 Drawing Sheets

(56) References Cited

U.S. PATENT DOCUMENTS

| | | | |
|---|---|---|---|
| 2013/0188863 A1 | 7/2013 | Linderman et al. | |
| 2014/0023271 A1* | 1/2014 | Baheti | G06K 9/4661 |
| | | | 382/171 |
| 2014/0111542 A1* | 4/2014 | Wan | G06F 17/30253 |
| | | | 345/633 |
| 2016/0026899 A1* | 1/2016 | Wang | G06T 7/11 |
| | | | 382/176 |

OTHER PUBLICATIONS

International Search Report & Written Opinion to corresponding International Application No. PCT/US201/038482 dated Sep. 30, 2016.

\* cited by examiner

METHODS AND SYSTEMS FOR DETECTING AND RECOGNIZING TEXT FROM IMAGES

BACKGROUND

The proliferation of mobile devices and data networks enable myriad ways of exchanging information instantaneously. Availability of digital cameras enables users to take as many pictures as they like and select particular ones to store and/or share while deleting undesirable pictures. In addition to the storage capacities of devices like digital cameras or smartphones, cloud storages for images have gained popularity. Users' vast corpus of images can now be uploaded to remote servers for storage or further processing. People can also use the digital cameras available on the smartphones to take pictures while the communicating components of the smartphones enable sharing the pictures instantaneously with their social networks.

SUMMARY

This disclosure relates to image processing systems and methods that enable recognizing text from images. The regions of an image that are likely to contain text are initially identified. Sequential prediction, action and analysis procedures are executed on the initial predictions for the image regions comprising the text/writing. During the procedures a trained model further analyzes the predicted image regions, for example, by employing high resolution sub-windows into the original image and outputs predictions regarding attributes of the text characters in the image. The predictions of characters are fed simultaneously or sequentially to a trained language model in order to refine the predictions to words. The words thus generated can be either stored as tags to the images or as a searchable index for the images.

It will be recognized from the disclosure herein that embodiments provide improvements to a number of technology areas, for example those related to systems and processes that handle or process images for users or business entities, and provide for improved user loyalty, improved image publishing, improved advertising opportunities, improved image search results, and improved picture taking A processor-executable image search method which enables searching of images based on the text imaged therein is disclosed in some embodiments. The method comprises, receiving, by a processor, a plurality of images. The method further comprises identifying, by the processor, an image that comprises text and regions of the image comprising the text. Character predictions for the text comprised in the image are obtained by the processor and at least one of a language and a domain of the characters comprised in the text are identified. The method further comprises generating, by the processor, words comprised in the text based on the identification of one or more of the language and the domain and generating an output comprising the text from the image in a textual data format. The output is stored by the processor in association with the image such that a search query comprising the output retrieves the image. In some embodiments, the text in the at least one image can be handwritten text.

In some embodiments, the method for identifying at least one of the images that comprise text further comprises, providing, by the processor to a neural network, training data and training, by the processor, the neural network on the training data. In some embodiments, the training data comprises images with text, information identifying portions of the images comprising the text and textual data format of the text comprised in the images. The method of identifying at least one of the images that comprises text further comprises providing, by the processor, the plurality of images to the trained neural network.

In some embodiments, obtaining character predictions by the processor, further comprises obtaining, by the processor, a respective weighted sampling of the pixels in each of a plurality of image regions comprised in the portion of the image and obtaining, by the processor, the character predictions based on the weighted sampling of the pixels in the plurality of image regions. In some embodiments, the method further comprises identifying, by the processor, characters from one or more of natural language character sets and domain-specific character sets that match the character predictions.

In some embodiments, the method further comprises providing, by the processor, an initial image set comprising images comprising text to a trained classifier and receiving output from the trained classifier, the output comprising information identifying portions of the images in the initial image set that comprise text and textual data format of the text comprised in the images of the initial image set. The output from the trained classifier is stored by the processor, as the training data. In some embodiments, the processor is a GPU (graphics processing unit).

In some embodiments, the method further comprises generating, by the processor, an index of a subset of the plurality of images comprising text, receiving, by the processor, a user search query comprising text, accessing, by the processor, the index of the subset of images and identifying, by the processor, images from the subset based on text matching of the text of the user search query with text comprised in images of the subset. The identified images are provided by the processor as results in response to the user search query.

A computing device comprising a processor and a storage medium for tangibly storing thereon image-processing program logic for execution by the processor is disclosed in some embodiments. The image-processing program logic can be executed by the processor for identifying and recognizing text from images in some embodiments. The processor-executable program logic comprises image receiving logic that receives a plurality of images, identifying logic that identifies at least one of the images that comprises text and region identifying logic that identifies regions of the image comprising the text. The program logic further comprises predicting logic that obtains character predictions for the text comprised in the image, character set identifying logic that identifies at least one of a language and a domain of the characters comprised in the text and word generating logic that generates words comprised in the text based on the identification of one or more of the language and the domain. Outputting logic that provides an output comprising the text from the image in a textual data format and storing logic that stores the output in association with the image are also comprised in the program logic. In some embodiments, the output is stored in association with the image such that a search query comprising the output retrieves the image.

In some embodiments, the program logic comprises sampling logic for obtaining a respective weighted sampling of the pixels in each of a plurality of image regions comprised in the portion of the image. The program logic also comprises training data providing logic that provides to a neural network, training data and logic that trains the neural network on the training data. In some embodiments, the training data comprises images with text, information identifying portions of the images comprising the text and textual data format of the text comprised in the images. In some embodiments, the program logic comprises logic for providing the plurality of images to the trained neural network.

In some embodiments wherein the at least one image comprises the subset of images, program logic further comprises logic for generating an index of a subset of the plurality of images. In some embodiments, the index comprises text from the subset of images. In some embodiments, the program logic comprises query receiving logic that receives a user search query comprising text, accessing logic that accesses the index of the subset of images, image identifying logic that identifies images from the subset based on text matching of the query text with the index entries and results providing logic that provides the identified images as results in response to the user search query.

A non-transitory computer readable storage medium comprising processor-executable instructions for identifying and recognizing text from images is disclosed in an embodiment. The computer readable storage medium comprises instructions that receive a plurality of images, identify at least one of the images that comprise text and identify regions of the image comprising the text. The instructions further comprise instructions that obtain character predictions for the text comprised in the image, identify at least one of a language and a domain of the characters comprised in the text, generate words comprised in the text based on the identification of one or more of the language and the domain, generate an output comprising the text from the image in a textual data format and store the output in association with the image such that a search query comprising the output retrieves the image.

In some embodiments, the instructions for identifying at least one of the images that comprise text further comprise instructions that provide to a neural network, training data and instructions that train the neural network on the training data. In some embodiments the instructions for obtaining character predictions further comprise instructions that obtain a respective weighted sampling of the pixels in each of a plurality of image regions comprised in the portion of the image and wherein the character predictions are obtained based on the weighted sampling of the pixels.

In some embodiments, the non-transitory computer readable storage medium further comprises instructions that generate an index of a subset of the plurality of images comprising text. In some embodiments, the index comprises respective text comprised in each image of the subset. The computer readable medium further comprises instructions that receive a user search query comprising text, access the index of the subset of images, identify images from the subset based on text matching and communicate information regarding the identified images to the user.

These and other embodiments /will be apparent to those of ordinary skill in the art with reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
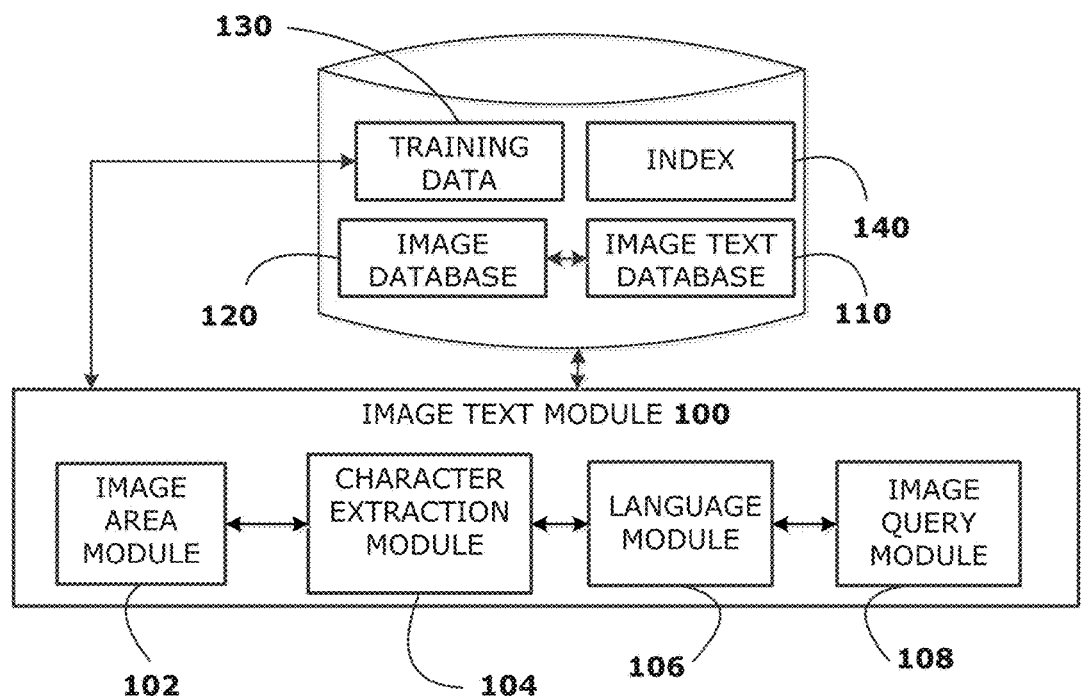
FIG. 1 illustrates an exemplary special purpose image text module that outputs the text from the images.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Embodiments are described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions or logic can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Throughout the specification and claims, terms may have nuanced meanings suggested or implied in context beyond an explicitly stated meaning Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The ubiquity of mobile networks and popularity of portable electronic devices enables users to take images of anything that they might want to remember. Also, large storage space is made available for users to store their images on cloud servers. The images can be individually tagged and stored on the servers which allow users to search for and find particular images at a later time. The images thus loaded can comprise multiple entities including text. For example, a user can take a picture of a road sign, a document or even a handwritten text. Sometime users can receive images which have objects, places and/or people in the background with text partly or entirely superimposed on them. When such images are tagged, the tags need not necessarily comprise the text from the images. The tags can be user-supplied words or phrases or they can be geo-tags which can be automatically generated by certain devices. It can therefore be difficult for a user to find an image which includes certain words or phrases. The problem can be compounded if the image includes handwritten text or text data in a language other than English.

Despite the success of constrained context OCR (Optical Character Recognition), such as well aligned high resolution scans of printed documents, accurate free-form text/writing recognition is yet to be developed. The problems presented by this technical shortfall are myriad, as the quantity of images being taken, uploaded, processed or shared by users and businesses is increasing rapidly, while the ability to process and search such images is not keeping pace.

The disclosure herein represents improvements in text detection that in turn lead to improvements in other technical fields such as image processing, image search, image sharing, on-line or mobile advertising, electronic publishing, social networking, and other technical fields utilizing images with embedded text.

Accurate recognition of free-form text or handwritten text from images, for example, can help users to search through an image store for particular images based on their recollection of the text data captured therein. Embodiments are disclosed herein for recognizing text including handwriting in the wild that helps users, businesses, advertisers or other applications search through stored images containing text or documents.

Turning now to the figures, FIG. 1 illustrates a special purpose image text module 100 that outputs the text from the images as set forth herein. In some embodiments, the image text module 100 can be an add-on service executing on a server attached to a cloud storage image database 120 wherein users store their images in private user storages. In some embodiments, the image text module 100 can be a special purpose component of imaging software executing on a user's personal computing device such as but not limited to a smartphone, a tablet device, a laptop or desktop in some embodiments. When executed on the user's computing device, the image database 120 and the image text database 110 can be personal storage databases of a user stored on the user's computing device. In some embodiments, the image text module 100 can reside and be executed on the user's personal computing device and its results can be uploaded to the image database 150 and the image text database 110 which can be part of a cloud storage server system.

By the way of illustration and not limitation, the image text module 100 comprises a number of further special purpose modules having special functionality described herein, such as image area module 102, a character extraction module 104 and a language module 106. In some embodiments, the output from the language module 106 can be shown on a display screen of a user device that provides the image(s) for analysis. In some embodiments, the output from the language module 106 can be stored in an image text database 110 as one or more of image tags and an entry in the image index 140. Although the image index 140 is shown as being disparate from the image text database 110, it can be appreciated that this is for illustration only and that the index 140 can be comprised in the image text database 110 in some embodiments. The image text database 110 can be communicatively coupled to the image database 120. This enables a user to execute a query on the contents of the image text database 110 in order to retrieve images that comprise the text included in the query.

The retrieved images can comprise one or more images wherein the text can be a caption superimposed partly or entirely on a picture background, the images can include real world objects on which the text is written such as but not limited to a signboard on which the text is painted or a whiteboard or document on which the text is handwritten or the images can comprise images of documents which are well-formatted (or not) for OCR. The image text module 100 therefore enables recognition of free-form text or writing "in the wild". The image text module 100 improves the ability to detect and parse text in free-form images. This can enable a broad variety of search use-cases. The images analyzed by the image text module 100 can be of any image format such as but not limited to .jpeg, .gif, .tif, .png and the like. The output generated by the image text module 100 can be text data format of the text pictured in the images.

In some embodiments, one or more of the image area module 102, a character extraction module 104 and the language module 106 can comprise neural networks that are trained with vast amounts of training data 130 in order to perform their various functions as detailed herein. A large number of images can be collected and filtered for those containing text-bearing regions for generating the training data 130. For identification of image areas comprising text, various models current exist that can identify image regions that include text. However, they tend to be slow besides being computationally expensive which makes them unsuitable for large scale commercial applications.

An initial aim of the training can be to replace the slow, hand-crafted detection methods with a rapid neural-network. Training data 130 can be generated by such hand-crafted detection mechanisms. The output obtained from these initial models can be recorded as the training data 130 which can be used to train the neural-networks associated with the image area module 102 in some embodiments. In addition to the bootstrapping methods discussed above, the training data can also be generated via crowd sourcing in some embodiments. For example, users can be provided with images comprising text such as as CAPTCHA text and their responses recorded as training data 130.

In some embodiments, the training data 130 can be artificially generated. For example, a large number of images comprising text can be generated. As the source of the images also has knowledge of the image contents, accurate training data is generated. The methodologies discussed supra for generating training data for the image area module 102 can be equally applied for generating training data 130 of the neural-networks associated with the character extraction module 104 and language module 106. In some embodiments, a feedback procedure can be incorporated into the image text module 100 wherein user feedback regarding text predictions can be collected and data associated with successful searches can be stored to further refine the training data 130.

The image area module 102 can be a neural network trained to identify portions of an image that are likely to comprise text. In some embodiments, the entire image can comprise only text. For example, OCR techniques are currently in use for extracting text from images that comprise only text data and wherein such text data is generally characterized by known attributes such as font formats, sizes and includes alphabets from a particular language. For example, OCR techniques can be effective on images comprising text data which includes only combinations of alphabets from A-Z in capitals or lower case letters or common punctuation characters. However, such OCR techniques tend to be ineffective when only a portion of an image comprises text data. For example, when the pixels of an image picture an image of an object and text, currently known OCR techniques are not very useful. Similarly, the current OCR techniques are not optimized to recognize text from images of handwriting or images having domain-specific characters.

In some embodiments, a portion of the training data 130 can be used for training the image area module 102 to identify portions of images that are likely to include text in accordance with embodiments described herein. Upon identifying areas of the images that are likely to include text, the character extraction module 104 analyzes the likely text-bearing portions of the images to extract the characters. In some embodiments, the character extraction module 104 can also be a neural network training in accordance with training methodologies discussed above. The character extraction module 104 can be trained in accordance with one or more of the crowd sourcing methodology or by bootstrapping from existing methods. In some embodiments, based on the detected regions, ground truth parses are produced to train the character extraction module 104. Various details of the characters, such as, font type, size, shape in addition to features such as but not limited to structures, edges, lines and the like can be analyzed and identified by the character extraction module 104 via training.

In some embodiments, the character extraction module 104 can be configured to provide predictions of characters via generating an identical image. The metadata associated with an image can be indicative of one or more of a device and software used to generate the image. If the software used for generating the image is known, the same software can be used to recreate the same image. The pixels values and arrangements identical to the image are recreated. The text included in the image can therefore be extracted accurately identify the characters included in the original image.

The output from the character extraction module 104 can be predictions for a sequence of characters which is fed to the language module 106. Characters from a plurality of languages can be analyzed by the language module 106 to generate words included in the image text. In some embodiments, the language module 106 can access domain-specific vocabulary for the identification of text. For example, the language module 106 can comprise special characters used in technical subjects such as but not limited to mathematics or computer programming. In some embodiments, the output from the character extraction module 104 can be stored until all the characters in an image are analyzed and forwarded in a single pass to the language module 106. In some embodiments, the characters can be transmitted from the character extraction module 104 to the language module 106 even as they are identified so that the character recognition and word building occur substantially simultaneously.

In some embodiments, the image text module 100 can also comprise an image query module 108. The image query module 108 can be configured to receive a text query from a user. In response to receiving the text query, the image query module 108 access the index 140 to identify index entries that match the text query. In some embodiments, the output from the language module 106 can be stored as plain text in the image text database 110. In some embodiments, the plain text can be indexed into a fuzzy string matching system. In some embodiments, the index 140 can be a bespoke index. The images associated with the matching index entries are retrieved from the image database 120 and presented to the user in some embodiments. In some embodiments, the information regarding the matching index entries can be initially shown to the user and images associated with the user-selected entries can be retrieved and shown to the user to save bandwidth. Although the image query module 108 is shown as part of the image text module 100, it can be appreciated that this is not necessary and that the image query module 108 can be disparate from the image text module 100 in accordance with some embodiments. The users, images can thus be indexed in real-time with textual content therein being searchable.

Figure 2:
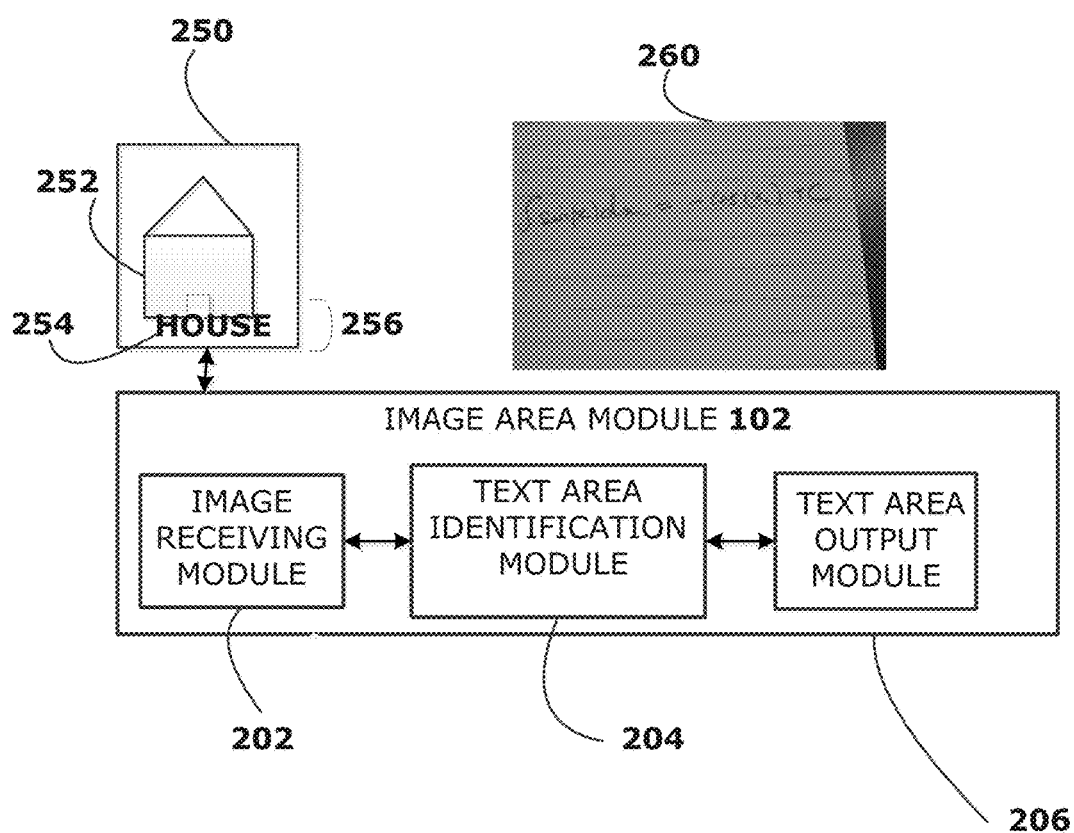
FIG. 2 is a schematic diagram showing the details of the special purpose image area module in accordance with some embodiments.

FIG. 2 is a schematic diagram showing the details of the special purpose image area module 102 in accordance with some embodiments. The image area module 102 comprises the image receiving module 202, text area identification module 204 and the text area output module 206. The image receiving module 202 accesses or receives images, for example from the image database 120 or other external data sources, that are to be analyzed to identify image areas that are likely to comprise text. In some embodiments, an initial filter can be applied as users upload images to flag those images that contain text.

By the way of illustration and not limitation, the images, wherein at least a subset of pixels are colored and shaped to form particular characters which can be domain specific symbols or alphabets of a particular language, can be flagged in the image database 120. Such flagged images can be received or accessed by the image receiving module 202. For example, images such as image 250 or image 260 comprising text data can be flagged and accessed by the image receiving module 202. The image 250 comprises not only a picture of a house 252 but also the letters that make up the word 'house' 254. It can be appreciated that the image 250 and the attributes of the text 254 such as the characters, size, shape and placement within the image 250 are only shown by the way of illustration. The text 254 can be of any language and can be placed at any portion of the image, for example, overlaid partially or completely over the picture 252 in accordance with embodiments described herein. The image 260 comprised handwritten text with characters particular to mathematics domain.

The images thus obtained are communicated to the text area identification module 204 which analyzes, for example, the image 250 and identifies the size and placement of the text-bearing portion 256 within the image 250. In some embodiments, the text area identification module 204 can be a neural network that is trained in accordance with techniques described above in order to identify the text-bearing portions of images. For example, one or more of crowd sourcing, generating synthetic images or bootstrapping to accurate yet slower image text identification methods can be employed to train the text area identification module 204. Upon identification of the text-bearing image portion 256, the attributes of the text-bearing image portion 256 such as its size, shape and placement within the image can be communicated by the image area output module 206 for further analysis.

Figure 3A:
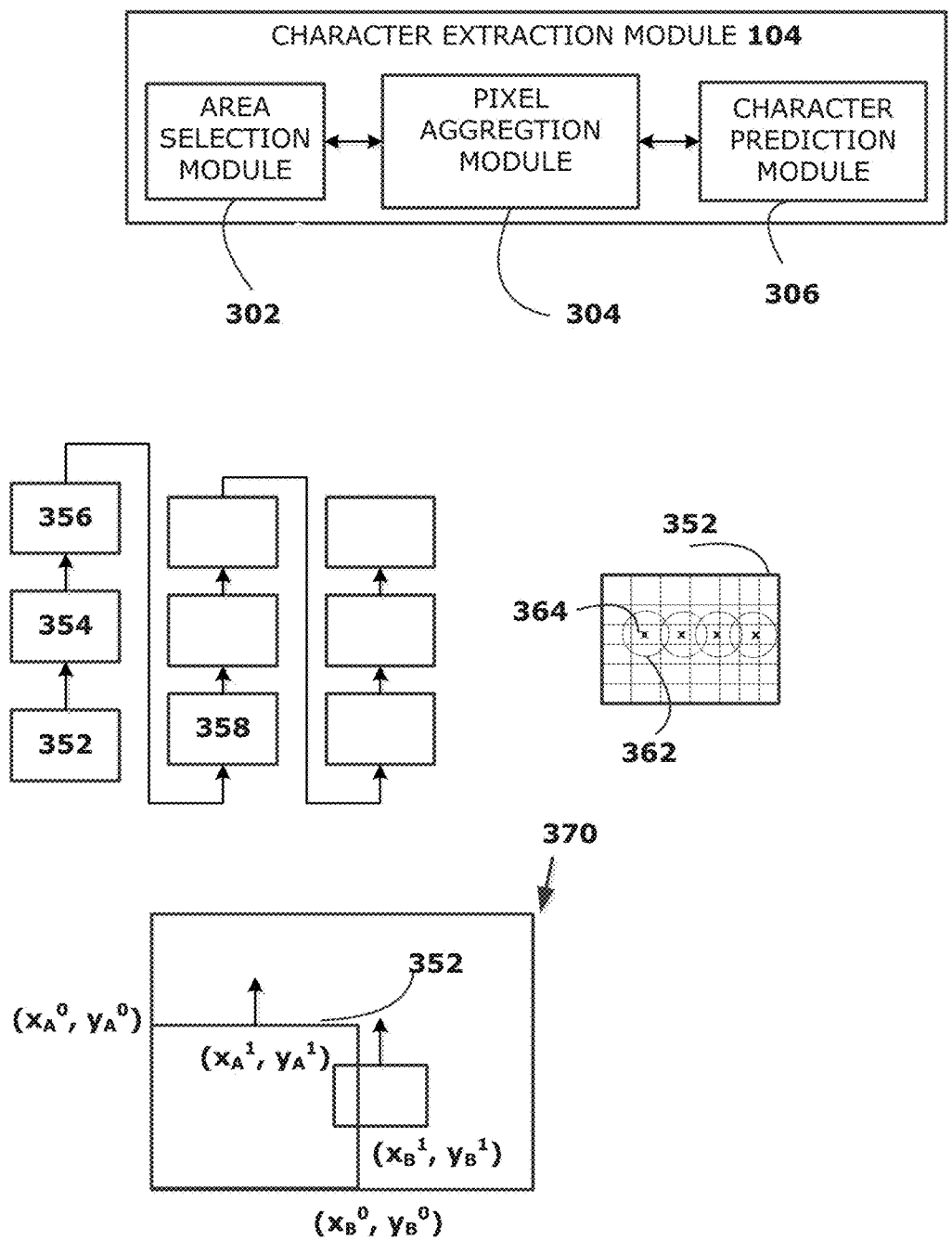
FIG. 3A is a schematic diagram showing the details of the special purpose character extraction module in accordance with some embodiments.

FIG. 3A is a schematic diagram showing the details of the special purpose character extraction module 104 in accordance with some embodiments. In some embodiments, the character extraction module 104 can be trained to both decide "where to look" (e.g. higher resolution sub-windows into the original image), and also to make predictions about the contents (e.g. what the characters/words are), and the type of text as well, such as, a road sign vs document vs whiteboard, etc. The character extraction module 104 comprises other special purpose modules such as an area selection module 302, a pixel aggregation module 304 and a character prediction module 306.

With reference to FIGS. 2 and 3A, the character extraction module 104 further analyzes the likely text-bearing image portion 256 as identified by the image area module 102. In some embodiments, the x, y coordinates of the image portion 256 that is likely to comprise text is obtained by the character extraction module 104. The area selection module 302 begins analysis of the image portion 256 by selecting a further image region 352 to begin the character extraction process. The further image regions 354, 356, 358 and the like are analyzed sequentially or in parallel to determine the presence of characters in these image portions. It can be appreciated that the order in which the image regions 352, 354, 356, 358 and the like is shown only by the way of illustration and not limitation and that order sequences the analysis of image regions can be employed in accordance with some embodiments.

Weighted pixel contributions to the presence of a character within smaller regions such as the region 362 of the selected region 352 are further determined by the pixel weighing module 304. In some embodiments, the pixel aggregation module 304 comprises instructions for obtaining a weighted sampling of the pixels within the region 362 as a function of their distances from the center 364 of the region 362 as:

$$f_{00}(\mu, \sigma, \rho) = \sum_{ij} \rho_{ij} c(\sigma) e^{\frac{(-(\mu - x_{ij})^2)}{2\sigma^2}} \quad \text{Eq. (1)}$$

In Eq. (1), $\rho_{ij}$ indicates a pixel value within the region 362 having the center $\mu$, width or radius $\sigma$ and lying within the area bounded by coordinates $(x_A^j, y_B^j)$ as shown at 370. The pixels closest to the center $\mu$ or center 364 carry the greatest weight and the weight decreases rapidly as the distance of the pixels from the center 364 increases as indicated by the exponential factor in Eq. (1), thereby providing scale invariance of the image pixels to the character prediction. Eq. (1) not only indicates the weightage of the pixels but also outputs the coordinates for the next fixation point which determines the movement of the scanning window over the selected region 352. As indicated at 370, the scanning window bounded by the coordinates $(x_A^j, y_B^j)$ moves in a manner that mimics the movement of a user's eyes as they read the textual content 254 of the image 250.

The character prediction module 306 receives the output of the aggregated pixel weights from the pixel aggregation module 304 for each of the region 352, 354, 356 and the like and obtains a character prediction. In some embodiments, the character prediction module 306 obtains a character prediction by estimating a Gaussian distribution of the aggregated pixel weightage obtained from the pixel aggregation module 304. Predictions regarding the likely characters of the image text, for example 254, thus obtained are fed to the language module 106.

Figure 3B:
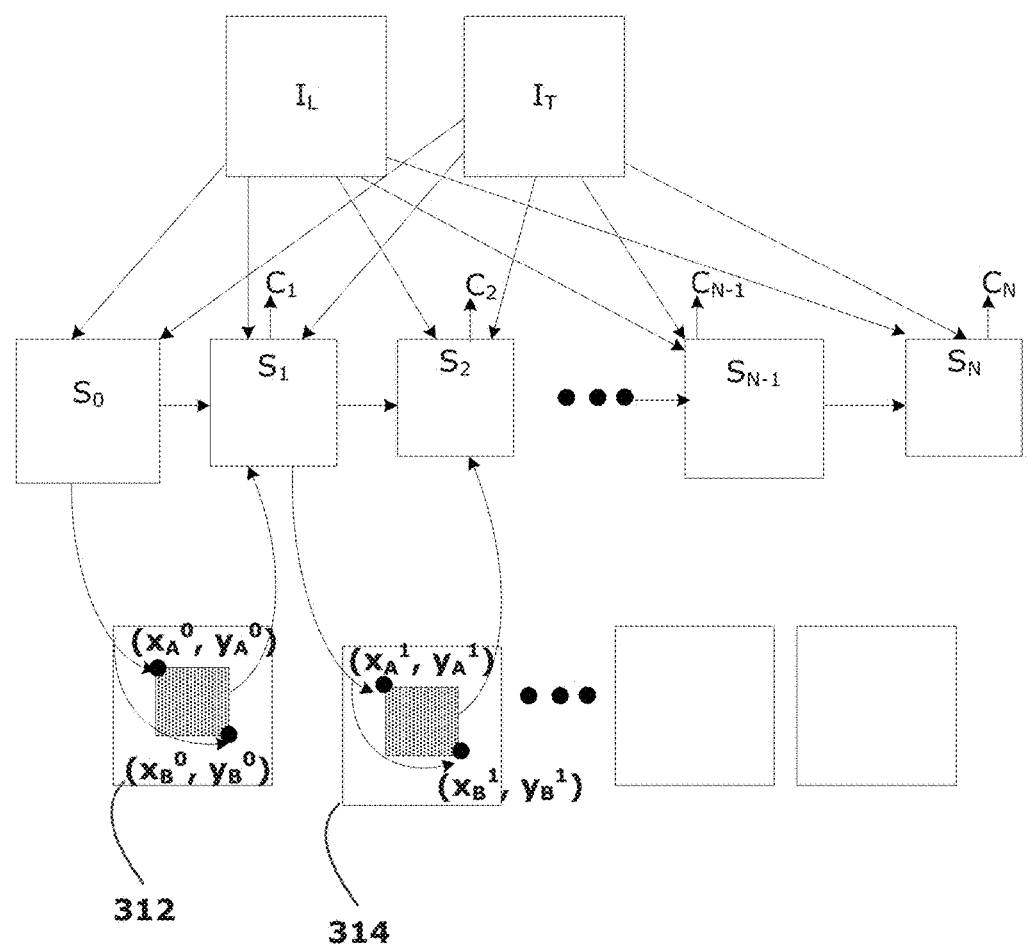
FIG. 3B is a schematic diagram showing the details of the processing of the character extraction module in accordance with some embodiments.

As discussed supra, the character extraction module 104 can be a neural network in accordance with some embodiments. FIG. 3B is a schematic diagram that shows the state transitions of the neural network comprised in character extraction module 104 in accordance with some embodiments. The state of the neural network can be initialized to $S_0$ which can be function of the low resolution image $I_L$ and the text map $I_T$ or the text bearing image portion 256.

$$S_0 = f_0(I_L, I_T) \quad \text{Eq. (2)}$$

The state of the neural network at a time step I is the function g which is a function of the low resolution image $I_L$ and the text map $I_T$ and the model's internal state at the previous time step $S_{i-1}$ and a function of r which is the current region being analyzed. In some embodiments, a low resolution image $I_L$ can be obtained from the high resolution input image 250 in accordance with methods currently known or to be invented.

$$S_i = g(I_L, I_T, S_{i-1}, r(I_H, x_A^{i-1}, y_A^{i-1}, x_B^{i-1}, y_B^{i-1})) \quad \text{Eq. (3)}$$

wherein $$[x_A^i, y_A^i, x_B^i, y_B^i] = h(S_{i-1}) \quad \text{Eq. (4)}$$

The function r can be determined as a function of $I_H$ and x, y coordinates of a current view window. So given the original high resolution image and the coordinates of the text-bearing image portion 256, any sub-window can be extracted on it and the pixel values obtained from it. In some embodiments, the pixel values can be further composed with $I_L$, $I_T$ and $S_{i-1}$, to obtain the state at time step i which is $S_i$. The square boxes 312, 314 etc. that are aligned horizontally, capture the neural network's state transition from one time step to another.

The x, y coordinates at time step i are the function of the model at time t−1 which is $h(S_{i-1})$. The coordinates of view window at time step i are the coordinates of the view model state at the previous time step i−1. $C_1$, $C_2$ are predictions themselves and $C_n$ are function of the state $S_n$. In some embodiments, the predictions can comprise one or more characters. In some embodiments, no prediction can be generated if data is inadequate or a prediction has been previously output. In some embodiments, the character predictions can be feedback into the model so g can also be a function of the prediction from previous time step.

In some embodiments, the language model can be part of selecting the final prediction based on C1, C2 etc. One possibility is to have character output, instead of being a precise choice, it can be a probability distribution—a distribution over characters or it can be a final single prediction. For example, a stroke being analyzed can be part of a character 'l' or 'i'. Therefore a distribution indicating 50% chance of the character being an 'l' or 'i' can be output. This output can be received by the language module 106 which based, for example, on predictions of previous letters can provide a prediction for the current letter. For example, if the previous characters were predicted to be 's' and 'h', then the language module 106 can provide a prediction that the character is likely to be 'i' than 'l' so the word 'ship' is being extracted from the image. In this case, the predictions can be fed to language module 106 directly to determine if further predictions are needed or if the characters can be extracted based on existing information. Thus, the states Si of the neural network are estimated until all the areas within the region 256 are covered. In some embodiments, when a state $S_N$ outputs a single letter prediction $C_N$ or the language module 106 determines the letter based on text processing techniques described above, the language module 106 can signal the character extraction module 104 or the neural network associated therewith to halt the iterations.

Figure 4:
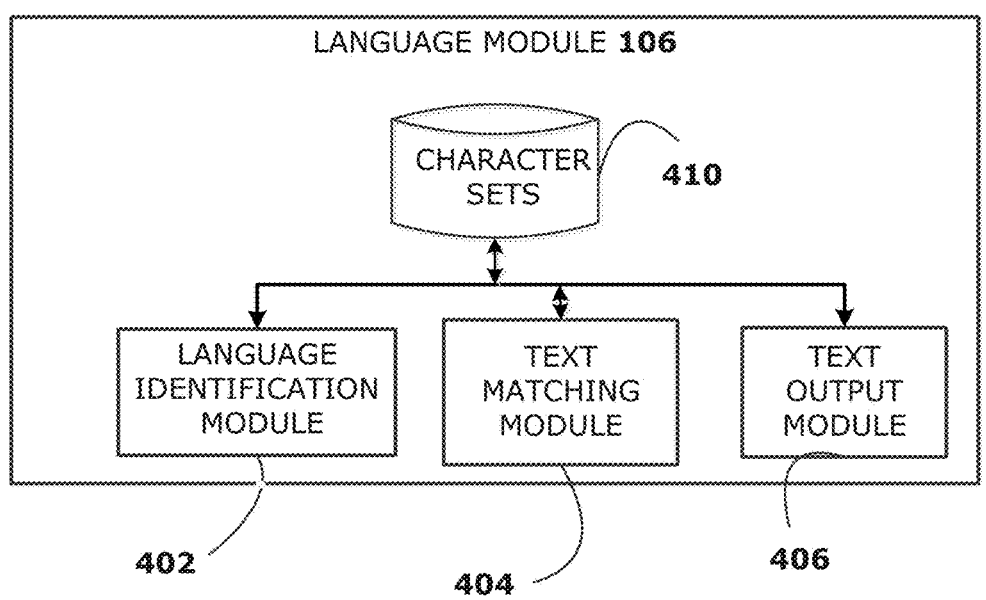
FIG. 4 is a schematic diagram of the special purpose language module in accordance with some embodiments.

FIG. 4 is a schematic diagram of the language module 106 in accordance with some embodiments, comprises further special purpose modules 402, 404, 406. In some embodiments, the language module 106 can be trained to turn predictions to actual words. The language module 106 can access character sets 410 associated with not only a plurality of the natural languages but can also access databases of multiple domain-specific characters. The words generated by the language module 106 can thus depend on the language of interest, or in the case of street-signs, or whiteboard handwritten text and similar domain-specific inputs, the predictions to valid tokens for the domain. Based on the character predictions from the character extraction module 104, the language module 106 can be trained to identify a language associated with the characters.

In some embodiments, text matching techniques commonly known in the art can be used for the language identification by the language identification module 402. As different natural languages like English, Arabic, Chinese and the like have very dissimilar characters, a broad identification of a language of interest for an image based on the character predictions can be obtained. Further differentiation between the languages like, English and Spanish or Chinese and Korean, having similar scripts can be obtained via training the language identification module 402. In some embodiments, the language identification module 402 can be configured to identify a language of interest for a given image via various image attributes and techniques as will be detailed further herein. For example, in embodiments, geo-location tags associated with an image or the network attributes used to upload the image can be employed for identifying the language of interest. In some embodiments, if no language of interest can be identified, the language identification module 402 can be configured to access domain-specific character sets. In some embodiments, a combination of a language and domain-specific character data can be necessary to fully decipher a script pictured in a given image.

The text matching module 404 can be trained to identify matching words for the received character predictions based on the identified language. String matching techniques currently known in the art to techniques to be invented can be used by the text matching module 404. In some embodiments, the text from an image can comprise a single character or it can comprise a string of characters that form a word or a combination of words that form a sentence. In some embodiments, a combination of a natural language characters and domain specific characters can also be identified by the text matching module 404.

The text output module 406 provides the text 256 from the image 250 as one or more of tokens that can be associated with the image to be stored in the image text database 110. In some embodiments, an index 140 of the words or characters can be built and associated with the image text database 120 so that a text query from a user can provide information regarding the images that contain the text from the query. For example, upon analysis of the image 250 and storage of the text 256 within the image text database 110, a user query for 'house' can retrieve at least the image 250. Although an image 250 with only one word is shown, it can be appreciated that the embodiments disclosed herein are not so limited and that an image with multi-word and/or a multi-line text can be similarly analyzed and its text stored to the image text database 120.

In some embodiments, the character extraction module 104 and the language module 106 can simultaneously analyze the text 256 from the image. For example, as predictions for each of the characters H, O, U, S and E in the text 256 are generated by the character extraction module 104, they can be communicated from to the language module 106. The language module 106 can be configured to receive each of the character predictions, identify the language and based on the language, generate the words from the predicted characters.

Figure 5:
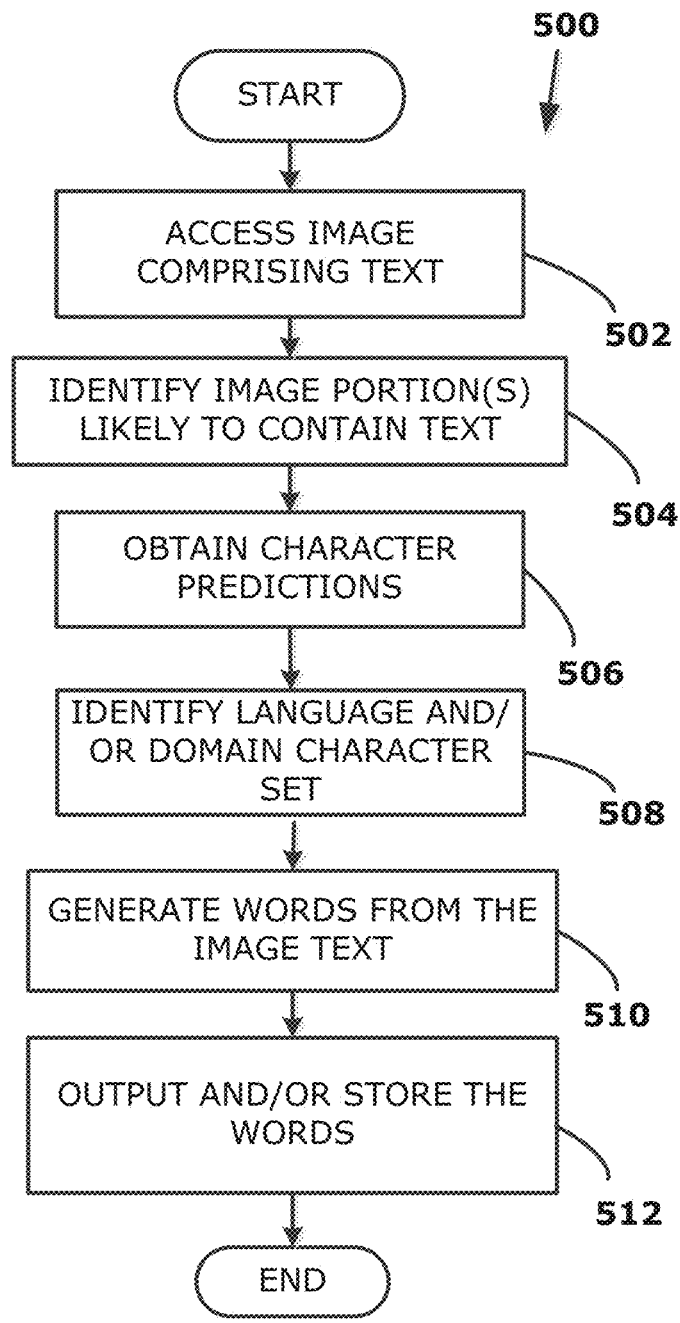
FIG. 5 is a flowchart that details a method of extracting text from images in accordance with some embodiments.

FIG. 5 is a flowchart 500 that details an exemplary method of extracting text from images in accordance with some embodiments. The method begins at 502 wherein an image 250 comprising some text therein is accessed. The portion 256 of the image 250 having text thereon is identified as a region likely to contain text at 504. As described herein, neural networks can be trained via various training methodologies such as but not limited to crowdsourcing via captchas, bootstrapping on to computationally expensive yet accurate algorithms and via generation of synthetic images. In some embodiments, the identification of likely text-bearing image portions can comprise outputting coordinates of the text-bearing portion 256 of the image 250.

The text-bearing image portions are scanned in a scale-invariant manner and predictions for characters are obtained at 506. The character predictions can be matched to known character sets in languages of interest or character sets from domain-specific vocabulary for language and/or domain character identification as shown at 508. In some embodiments, the language of interest can be identified based on various attributes. For example, user attributes or locations from which the images were uploaded can be used to identify the language of interest. A default language of interest can be universally defined in some embodiments. In some embodiments, the default language of interest can be based on the location from which the images were uploaded which can be obtained for example, via analysis of the IP address or mobile network attributes. In some embodiments, the default language of interest can be identified based on other image attributes such as, geo-location information that may be associated with the image.

Upon identifying one or more of a language of interest and a domain specific character set, the word(s) from the image 250 is generated at 510. The language module 106 can therefore be integrated as part of the character extraction module 104 or the language identification can be applied as a separate dynamic programming inference pass based on the character predictions to refine such predictions to actual words. In some embodiments, wherein the steps 506, 508 and 510 occur sequentially, predictions for the characters in the image text are buffered and the word building process steps 508, 510 are initiated after the character prediction process at 506 is terminated. A larger set of character predictions can be therefore available for identifying a language and/or domain specific character set at 508.

In some embodiments, the steps 506, 508 and 510 can occur in parallel wherein each character prediction at 506 is communicated to the language module 106 for word building. This can make the word building process faster. The words output at 510 can be either displayed to the user and/or stored to the image text database 110 to facilitate future access and other functionality such as, image searches by a user. It can be appreciated that although English characters are shown in the image 250, the methods and systems described herein a not so limited. It can be appreciated that they can be applied to any of the natural languages, domain specific characters or combinations thereof.

Figure 6:
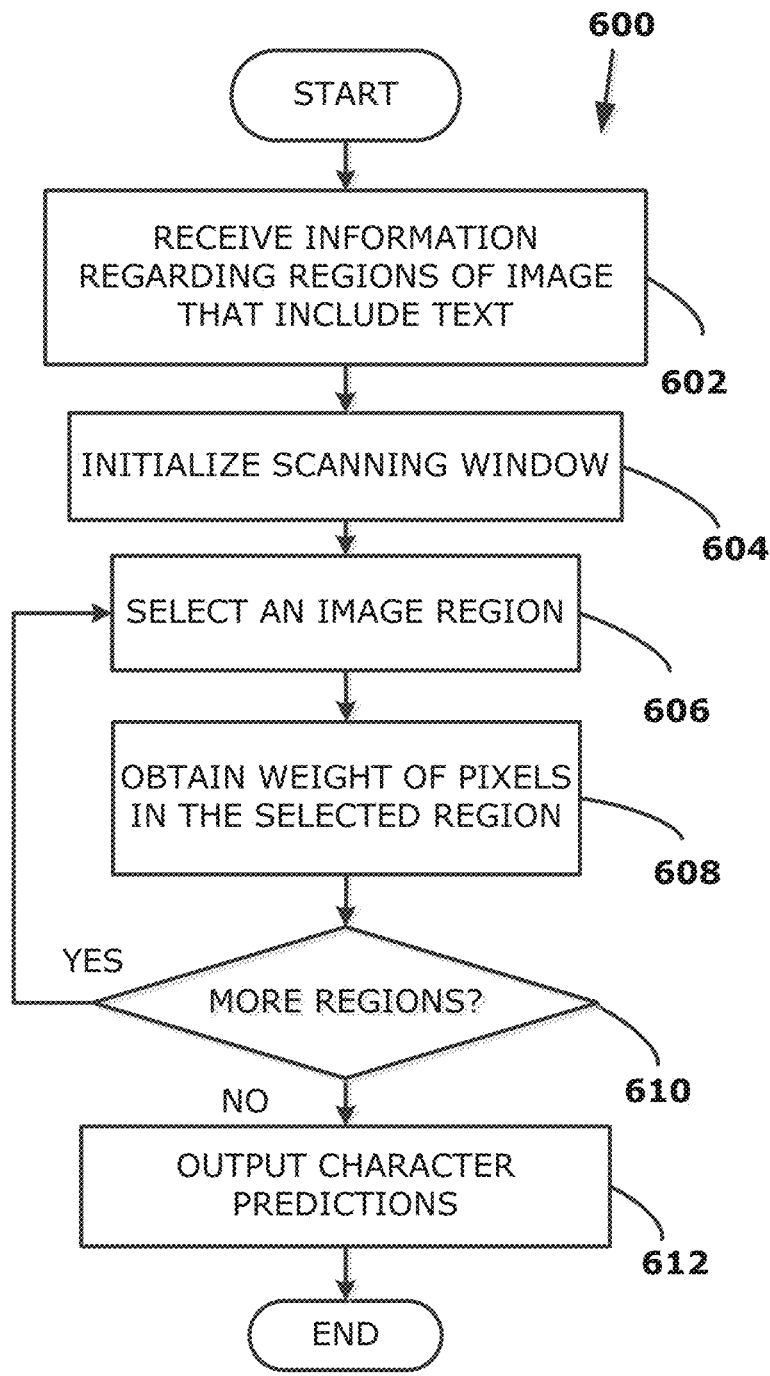
FIG. 6 is a flowchart that details a method for obtaining character predictions in accordance with some embodiments.

FIG. 6 is a flowchart 600 that details an exemplary method for obtaining character predictions in accordance with some embodiments. At 602, the information regarding the portions 264 of the image 250 that include text is obtained. In some embodiments, the information can comprise the coordinates of the text-bearing image portions. A scanning window for analyzing the image portion 264 can be initialized at 604. In some embodiments, the image portion 264 can be hypothetically divided into further plurality of image regions 352, 354 etc., wherein the scanning window moves from one image region to the other for analysis of the image data. An image region, for example, 352 is selected for image data analysis at 606. The weighted sampling of the pixels or contribution of the pixels towards a character comprised in the image region is obtained at 608. At 610, it is determined if more image regions remain for analysis. If yes, the method returns to step 606 for selecting the next image region and its pixel weightage is calculated as shown at 608.

As mentioned herein, the weighted contribution of the pixels in an image region can be obtained using Eq. (1) detailed above in accordance with some embodiments. The character predictions are output at 612 based on the weighted pixel contributions from the plurality of image regions. In some embodiments, a Gaussian spread of the weighted pixel contributions can be estimated in order to obtain a character prediction at 612.

Figure 7A:
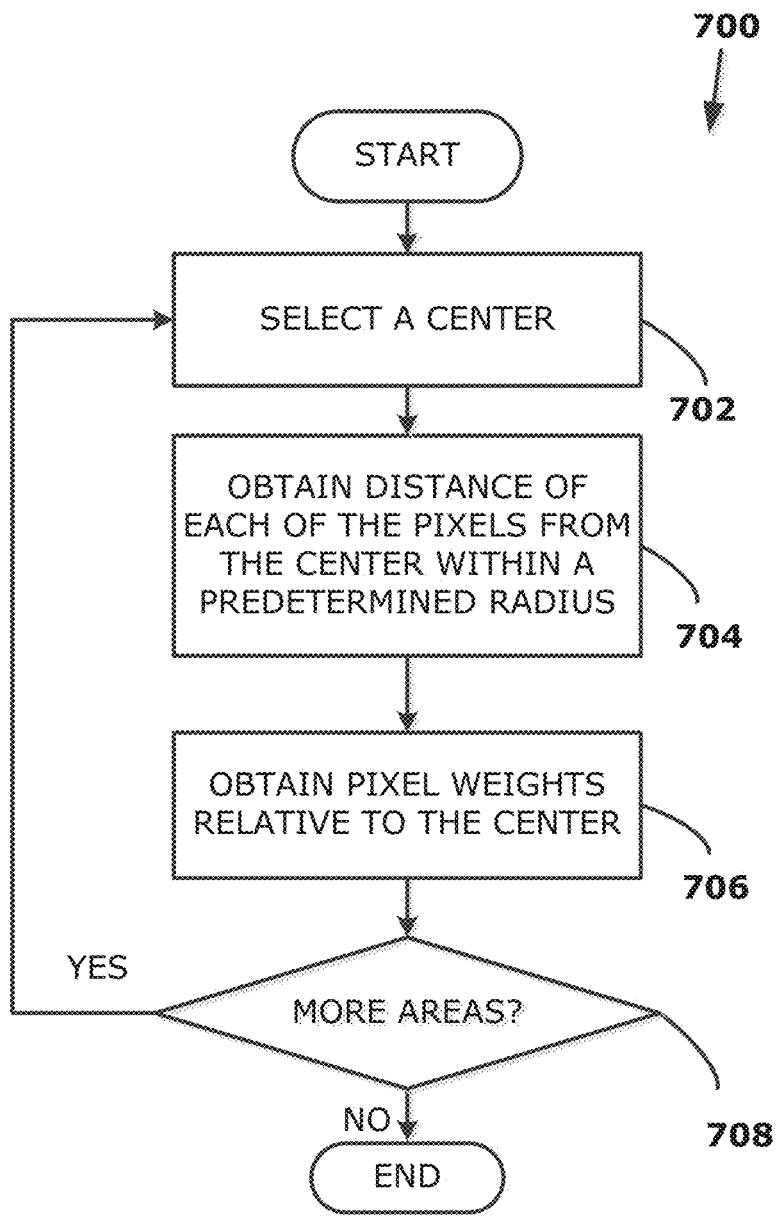
FIG. 7A is a flowchart that details a method of obtaining weighted sampling of pixels in accordance with some embodiments.

FIG. 7A is a flowchart 700 that details an exemplary method of obtaining weighted sampling of pixels in accordance with some embodiments. The method begins at 702 wherein, within a selected region, a central point 364 is selected relative to which the pixels weights are estimated. The weighted contributions of the pixels around the central point 364 and within a predetermined radius are estimated. In some embodiments, a plurality of such central point can be selected based on the total area of the text-bearing image portion 256. In some embodiments, the predetermined radius can be a scalar constant. Thus, the weighted sampling of pixels obtained via the method detailed herein can be scale invariant. The distance of each of the pixels within the predetermined radius of the selected center 364 is obtained at 704. At 706, the pixel weight is calculated as a function of the distance. In some embodiments, a weighted sampling of the pixels around the center μ, and within a predetermined radius σ can be obtained by Eq. (1) detailed above. At 708, it is determined if more areas of the image region 35 exist for obtaining pixel weights. If yes, the method returns to step 702, else it terminates on the end block.

Figure 7B:
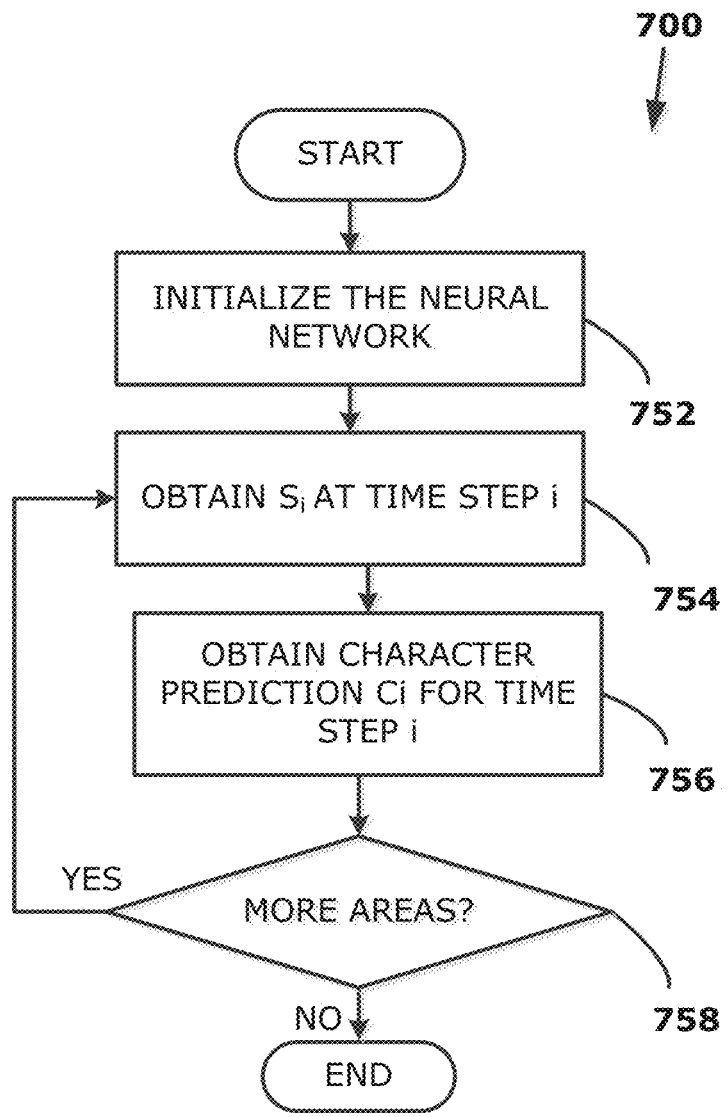
FIG. 7B is a flowchart that details a method of extracting characters in accordance with some embodiments.

FIG. 7B is a flowchart 750 that details a method of extracting characters in accordance with some embodiments. The method begins at 752 wherein a neural network for the extraction of characters is initialized. In some embodiments, the neural network can be set to an initial state $S_0$ which can be based on a low resolution image $I_L$ and $I_T$ the image portion comprising text 256. The state of the neural network $S_i$ at a subsequent time step i>0 is estimated at 754. In some embodiments, the state $S_i$ can be determined as a function of the state at the previous time step Si−1, $I_L$, $I_T$ and r. In some embodiments, r is a function of the Cartesian coordinates of the image area 352 and pixel values therein. The character prediction at state Si is obtained at 756. Again as discussed supra, one or more characters can be predicted at 756. In some embodiments, the character predictions can be provided to the language module 106 for further analysis or processing to further refine the predictions obtained at 756. At 758, it is determined if more areas of the image portion 256 remain to be processed. If yes, the method returns to 754 to obtain the state of the neural network at time step i+1. The method terminates if it is determined at 758 that no more areas remain to be processed.

Figure 8:
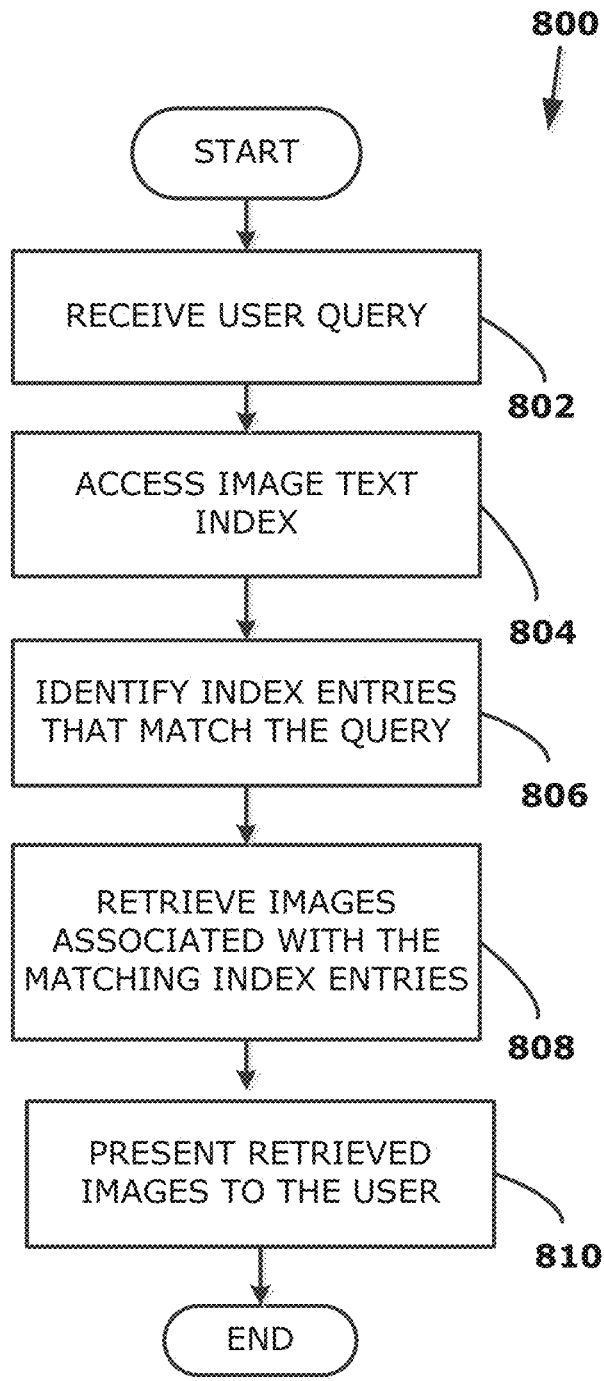
FIG. 8 is a flowchart that details a method of enabling image search in accordance with some embodiments described herein.

FIG. 8 is a flowchart 800 that details an exemplary method of enabling image search in accordance with some embodiments described herein. The method begins with receiving a text query from a user at 802. In some embodiments, the user may desire to obtain not only images which have textual content such as tags associated therewith but also images which actually picture the textual query provided by the user. For example, the attributes of at least a subset of the image pixels, such as shape, size and color are so set that they define the text from the user query. At 804, an index 140 built of such textual content from images is accessed. In some embodiments, the index can be built by the image text module 100 in accordance with embodiments described herein. At 806, the text from the user's query is matched to the index contents, for example, using string matching algorithms. In some embodiments, based for example on user preferences, one or more of the index entries that contain the user's query (super-strings) or which are contained in the user's query (sub-strings) or which exactly match the user's query can be identified at 806. At 808, the images from the image database 120 that are associated with the matching index entries are retrieved. At 810, one or more of information regarding the retrieved images and/or the retrieved images are presented to the user. In some embodiments, a user interface showing user-selectable thumbnail images of the retrieved images can be initially shown to a user. When the user selects one or more of the thumbnail images, the original image can be transmitted for display to the user. As images tend to be resource intensive, retrieving and sending only selected images to the user can save bandwidth resources.

Figure 9:
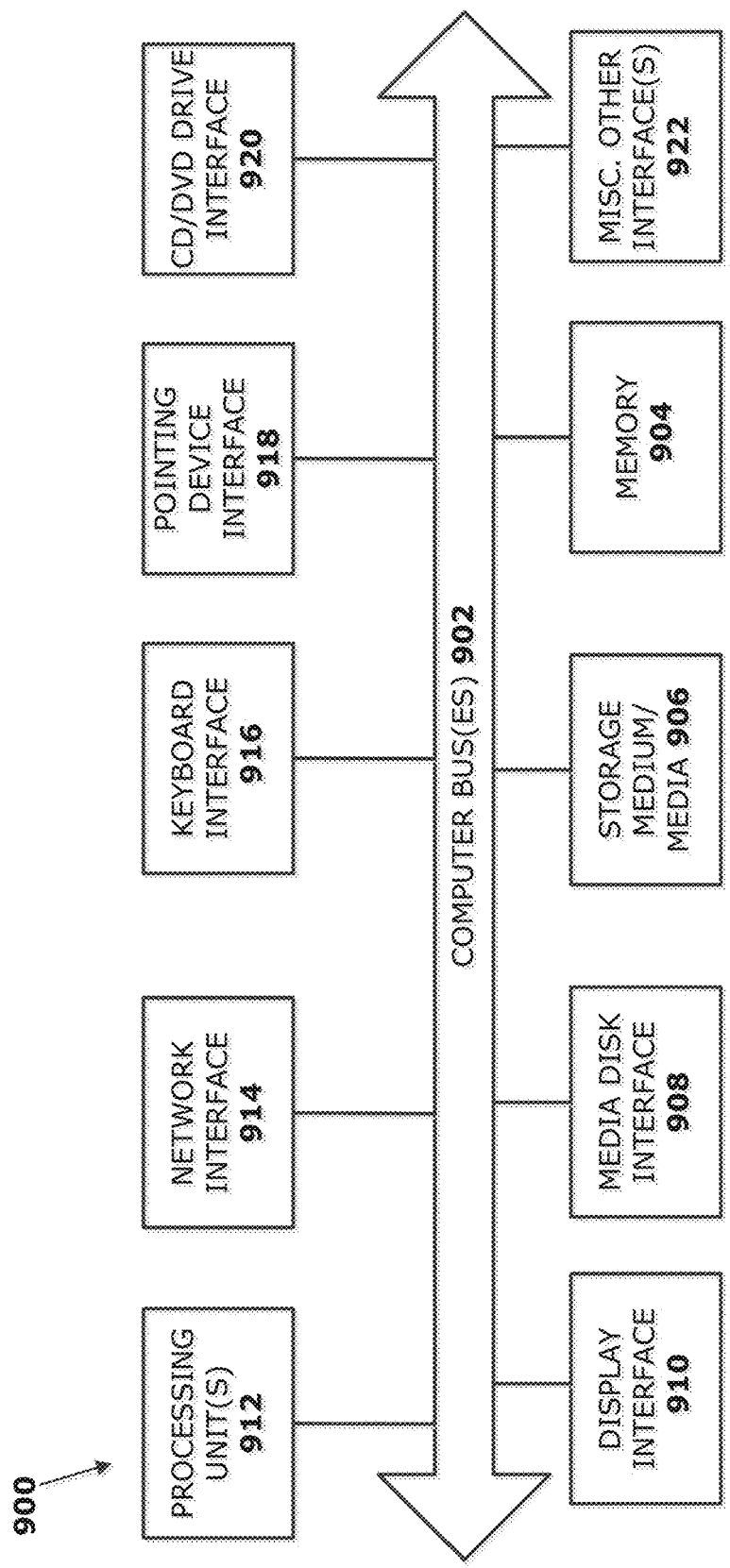
FIG. 9 shows the internal architecture of a computing device that can store and/or execute an image text module in accordance with embodiments described herein.

As shown in the example of FIG. 9, internal architecture of a computing device that can store and/or execute an image text module 100 in accordance with embodiments described herein. For example, the computing device 900 can be a server networked to a cloud storage database that receives and processes thousands of user images in accordance with embodiments described herein. In some embodiments, the computing device 900 can be configured to generate training data in accordance with embodiments described herein to train the image text 100 for executing the various tasks as detailed herein. The computing device 900 includes one or more processing units 912, which interface with at least one computer bus 902. In some embodiments, the processing units can comprise one or more of general purpose processors such as Central Processing Units (CPUs) and Graphics Processing Units (GPUs). Also interfacing with computer bus 902 are persistent storage medium/media 906, network interface 914, memory 904, e.g., random access memory (RAM), run-time transient memory, read only memory (ROM), etc., media disk drive interface 908, an interface 920 for a drive that can read and/or write to media including removable media such as floppy, CD-ROM, DVD, etc., media, display interface 910 as interface for a monitor or other display device, keyboard interface 916 as interface for a keyboard, pointing device interface 918 as an interface for a mouse or other pointing device, and miscellaneous other interfaces 922 not shown individually, such as parallel and serial port interfaces, a universal serial bus (USB) interface, and the like.

Memory 904 interfaces with computer bus 902 so as to provide information stored in memory 904 to CPU 912 during execution of software programs such as an operating system, application programs, device drivers, and software modules that comprise program code or logic, and/or computer-executable process steps, incorporating functionality described herein, e.g., one or more of process flows described herein. CPU 912 first loads computer-executable process steps or logic from storage, e.g., memory 904, storage medium/media 906, removable media drive, and/or other storage device. CPU 912 can then execute the stored process steps in order to execute the loaded computer-executable process steps. Stored data, e.g., data stored by a storage device, can be accessed by CPU 912 during the execution of computer-executable process steps.

Persistent storage medium/media 906 is a computer readable storage medium(s) that can be used to store software and data, e.g., an operating system and one or more application programs. Persistent storage medium/media 906 can also be used to store device drivers, such as one or more of a digital camera driver, monitor driver, printer driver, scanner driver, or other device drivers, web pages, content files, metadata, playlists and other files. Persistent storage medium/media 906 can further include program modules and data files used to implement one or more embodiments of the present disclosure.

Figure 10:
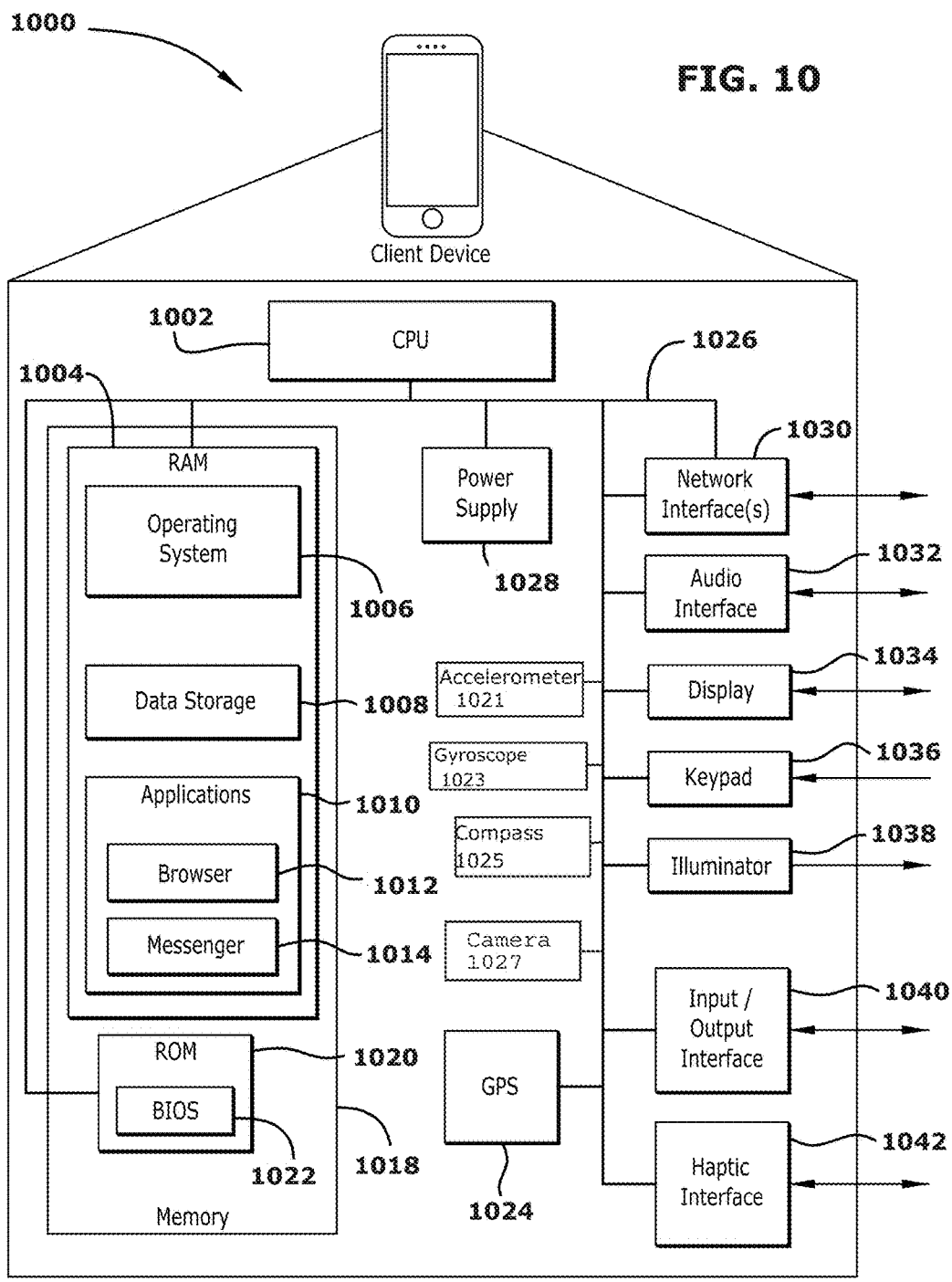
FIG. 10 is a schematic diagram illustrating a client device implementation of a computing device in accordance with embodiments of the present disclosure.

FIG. 10 is a schematic diagram illustrating a client device implementation of a computing device in accordance with embodiments of the present disclosure. For example, a client device 1000 can comprise an image text module 100 in accordance with embodiments described herein. The text data resulting from the image analysis by the client device 1000 can be initially stored locally on the client device 1000. When the client device 1000 is connected to a server, the image analysis results can be uploaded to an external storage via the server. A client device 1000 may include a computing device capable of sending or receiving signals, such as via a wired or a wireless network, and capable of running application software or "apps" 1010. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. The client device can include standard components such as a CPU 1002, power supply 1028, a memory 1018, ROM 1020, BIOS 1022, network interface(s) 1030, audio interface 1032, display 1034, keypad 1036, illuminator 1038, I/O interface 1040 interconnected via circuitry 1026. Claimed subject matter is intended to cover a wide range of potential variations. For example, the keypad 1036 of a cell phone may include a numeric keypad or a display 1034 of limited functionality, such as a monochrome liquid crystal display (LCD) for displaying text. In contrast, however, as another example, a web-enabled client device 1000 may include one or more physical or virtual keyboards 1036, mass storage, one or more accelerometers 1021, one or more gyroscopes 1023, a compass 1025, global positioning system (GPS) 1024 or other location identifying type capability, Haptic interface 1042, or a display with a high degree of functionality, such as a touch-sensitive color 2D or 3D display, for example. The memory 1018 can include Random Access Memory 1004 including an area for data storage 1008. The client device 1000 can also comprise a camera 1027 or other optical and/or thermal sensors.

A client device 1000 may include or may execute a variety of operating systems 1006, including a personal computer operating system, such as a Windows, iOS or Linux, or a mobile operating system, such as iOS, Android, or Windows Mobile, or the like. A client device 1000 may include or may execute a variety of possible applications 1010, such as a client software application 1014 enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. A client device 1000 may also include or execute an application to communicate content, such as, for example, textual content, multimedia content, or the like. A client device 1000 may also include or execute an application to perform a variety of possible tasks, such as browsing 1012, searching, playing various forms of content, including locally stored or streamed content, such as, video, or games (such as fantasy sports leagues). The foregoing is provided to illustrate that claimed subject matter is intended to include a wide range of possible features or capabilities.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server. Servers may vary widely in configuration or capabilities, but generally a server may include one or more central processing units and memory. A server may also include one or more additional mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links, such as may be known to those skilled in the art. Furthermore, a computing device or other related electronic devices may be remotely coupled to a network, such as via a telephone line or link, for example.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), program logic, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
receiving, by a processor, a plurality of images;
identifying, by the processor, an image of the plurality of images that comprises text;
identifying, by the processor, regions of the image comprising the text;
obtaining, by the processor, character predictions for the text comprised in the image comprising obtaining a weight of each pixel as a function of distance to a central point in each of the identified regions of the image comprising the text and obtaining a weighted sampling of pixels around the central point of each of the identified regions by scanning from one region to the other within the image comprising the text;

identifying, by the processor, at least one of a language and a domain of the characters comprised in the text;

generating, by the processor, words comprised in the text based on the identification of one or more of the language and the domain;

generating, by the processor, an output comprising the text from the image in a textual data format; and storing, by the processor, the output in association with the image so that a search query comprising the output causes retrieval of the image.

2. The method of claim 1, identifying the image of the plurality of images that comprises text further comprises:

providing, by the processor to a neural network, training data comprising images with text, information identifying portions of the images comprising the text and textual data format of the text comprised in the images with text; and training, by the processor, the neural network on the training data.

3. The method of claim 1, identifying the image of the plurality of images that comprises text further comprises:

providing, by the processor, the plurality of images to a trained neural network.

4. The method of claim 1, obtaining character predictions by the processor, further comprises:

obtaining, by the processor, the character predictions based on the weighted sampling of the pixels in the regions of the image.

5. The method of claim 4, further comprising:

identifying, by the processor, characters from one or more of natural language character sets and domain-specific character sets that match the character predictions.

6. The method of claim 1, further comprising:

providing, by the processor, an initial image set comprising images comprising text to a trained classifier;

receiving, by the processor, output from the trained classifier, the output comprising information identifying portions of the images in the initial image set that comprise text and textual data format of the text comprised in the images of the initial image set; and storing, by the processor, the output from the trained classifier as training data.

7. The method of claim 5, wherein the processor is a GPU (graphics processing unit).

8. The method of claim 1, further comprising:

generating, by the processor, an index of a subset of a plurality of images comprising text, the index comprising respective text from each of the subset of images;

receiving, by the processor, a user search query comprising text;

accessing, by the processor, the index of the subset of images;

identifying, by the processor, images from the subset based on text matching of the text of the user search query with text comprised in images of the subset.

9. The method of claim 8, further comprising:

providing, by the processor, the identified images as results in response to the user search query.

10. The method of claim 1, the text in the image being handwritten text.

11. An apparatus comprising:

a processor; and a non-transitory computer readable storage medium comprising processor-executable logic, the processor-executable logic comprising:

image receiving logic that receives a plurality of images;

identifying logic that identifies an image of the plurality of images that comprises text;

region identifying logic that identifies regions of the image comprising the text;

predicting logic that obtains character predictions for the text comprised in the image comprising obtaining a weight of each pixel as a function of distance to a central point in each of the identified regions of the image comprising the text and obtaining a weighted sampling of pixels around the central point of each of the identified regions by scanning from one region to the other within the image comprising the text;

character set identifying logic that identifies at least one of a language and a domain of the characters comprised in the text;

word generating logic that generates words comprised in the text based on the identification of one or more of the language and the domain;

outputting logic that provides an output comprising the text from the image in a textual data format; and storing logic that stores the output in association with the image so that a search query comprising the output causes retrieval of the image.

12. The apparatus of claim 11, the identifying logic further comprises:

training data providing logic that provides to a neural network, training data comprising images with text, information identifying portions of the images comprising the text and textual data format of the text comprised in the images with text; and logic that trains the neural network on the training data.

13. The apparatus of claim 11, the identifying logic further comprises:

logic for providing the plurality of images to a trained neural network.

14. The apparatus of claim 11, wherein at least one image comprises a subset of the plurality of images further comprising:

logic for generating an index of the subset of a plurality of images comprising text, the index comprising respective text from each image of the subset.

15. The apparatus of claim 14, further comprising:

query receiving logic that receives a user search query comprising text;

accessing logic that accesses the index of the subset of images;

image identifying logic that identifies images from the subset based on text matching; and results providing logic that provides the identified images as results in response to the user search query.

16. A non-transitory computer readable storage medium comprising processor-executable instructions that:

receive a plurality of images;

identify an image of the plurality of images that comprises text;

identify regions of the image comprising the text;

obtain character predictions for the text comprised in the image comprising obtain a weight of each pixel as a function of distance to a central point in each of the identified regions of the image comprising the text and obtaining a weighted sampling of pixels around the central point of each of the identified regions by scanning from one region to the other within the image comprising the text;

identify at least one of a language and a domain of the characters comprised in the text;

generate words comprised in the text based on the identification of one or more of the language and the domain;

generate an output comprising the text from the image in a textual data format; and store the output in association with the image so that a search query comprising the output causes retrieval of the image.

17. The non-transitory computer readable storage medium of claim 16, the instructions for identifying the image of the plurality of images that comprises text further comprises instructions that:

provide to a neural network, training data comprising images with text and information identifying portions of the images comprising the text and textual data format of the text comprised in the images with text; and training the neural network on the training data.

18. The non-transitory computer readable storage medium of claim 16, the instructions for obtaining character predictions further comprises instructions that:

obtain the character predictions based on the weighted sampling of the pixels in the image regions.

19. The non-transitory computer readable storage medium of claim 16, further comprising instructions that:

generate an index of a subset of a plurality of images comprising text, the index comprising the subset of images indexed by respective text comprised therein;

receive a user search query comprising text;

access the index of the subset of images;

identify images from the subset based on text matching; and communicate information regarding the identified images from the subset to the user.

20. The non-transitory computer readable storage medium of claim 16, the instructions for obtaining the character predictions further comprise instructions that:

initialize a state of a neural network based on a low resolution image corresponding to the at least one image and coordinates of the regions of the image comprising the text;

estimate a state of the neural network at a subsequent time step as a function of the low resolution image, the coordinates and the initial state; and output character predictions from the state at the subsequent time step.

21. The non-transitory computer readable storage medium of claim 20, further comprising instructions that:

iterate through states of the neural network at different time steps respectively corresponding to areas within the regions of the image comprising the text;

output character predictions at each of the states until a character is extracted based on the character predictions from the different time steps.

22. The non-transitory computer readable storage medium of claim 21, the character predictions at each of the states comprising one or more letters of the language.

* * * * *